US010035925B2

(12) United States Patent
Moon et al.

(10) Patent No.: US 10,035,925 B2
(45) Date of Patent: Jul. 31, 2018

(54) COMPOSITION FOR CAR INTERIOR TRIM AND PREPARATION METHOD USING THE SAME

(71) Applicant: S&B CO., LTD., Gyeongsangbuk-do (KR)

(72) Inventors: Soo-Ho Moon, Chungcheongnam-do (KR); Jin-Bae Cho, Incheon (KR); Man-Ho Lee, Gyeonggi-do (KR); Ki-Pyoung Yang, Daegu (KR); Seoung-Jee Lee, Gyeongsangbuk-do (KR); Chong Hoon Lee, Ulsan (KR)

(73) Assignee: S&B CO., LTD., Gyeongju-si, Gyeongsangbuk-do (KR)

( * ) Notice: Subject to any disclaimer, the term of this patent is extended or adjusted under 35 U.S.C. 154(b) by 137 days.

(21) Appl. No.: 15/062,216

(22) Filed: Mar. 7, 2016

(65) Prior Publication Data
US 2016/0257849 A1 Sep. 8, 2016

(30) Foreign Application Priority Data
Mar. 6, 2015 (KR) ........................ 10-2015-0031806

(51) Int. Cl.
C09D 175/08 (2006.01)
C08J 9/36 (2006.01)
C08K 5/521 (2006.01)
C08L 33/08 (2006.01)
C08J 9/00 (2006.01)
C08K 5/00 (2006.01)

(52) U.S. Cl.
CPC .......... *C09D 175/08* (2013.01); *C08J 9/0038* (2013.01); *C08J 9/365* (2013.01); *C08K 5/521* (2013.01); *C08L 33/08* (2013.01); *C08J 2375/04* (2013.01); *C08J 2433/08* (2013.01); *C08J 2475/04* (2013.01); *C08K 5/0066* (2013.01)

(58) Field of Classification Search
CPC combination set(s) only.
See application file for complete search history.

(56) References Cited

U.S. PATENT DOCUMENTS

2004/0265567 A1 12/2004 Janzen
2005/0177950 A1* 8/2005 Niederoest ............. A47C 27/14
5/698

FOREIGN PATENT DOCUMENTS

| CN | 104312352 | * | 1/2015 |
| JP | 7-330843 A | | 12/1995 |
| JP | 2004-533321 A | | 11/2004 |
| KR | 10-2008-0008520 A | | 1/2008 |
| KR | 10-1326686 B1 | | 11/2013 |

OTHER PUBLICATIONS

Translation of CN 104312352, Jan. 2015.*

* cited by examiner

Primary Examiner — Erma C Cameron
(74) Attorney, Agent, or Firm — Revolution IP, PLLC

(57) ABSTRACT

A composition for a car interior trim including: a polyurethane sponge layer for a car interior trim; and a water-soluble resin layer formed on the polyurethane sponge layer and comprising 20 to 50 parts by weight of a phosphorus-based flame retardant and 1 to 5 parts by weight of a thickener, based on 100 parts by weight of a coating agent blend of one or two more of a water-dispersed polyurethane or an aqueous acrylic resin.

6 Claims, 9 Drawing Sheets

FIG. 3

Flammability Test Report

November 27, 2014

| Model | All | Tester: Yeon Na LEE | | |
|---|---|---|---|---|
| Part No. | - | Maker Name: S&B., Ltd. | | |
| Part Name | - | Charge | Review | Approval |
| Color & Spec. | 7T60KG olefin | | | |
| Quality Grade | - | | | |
| Material Maker | - | | | |
| Component Delivery Route | - | Result | (Pass) | Fail |
| Flame Retardancy Requirement | NS 300-06 | Test object | | |
| Flame Retardancy Treatment | - | Management | (New) | Improvement |
| Wire mounting part | Not available | Product date | Nov. 27, 2014 | |
| Specimen Size | Length (350mm) Width(100mm) | LOT No. | | |

| Adjustment condition of specimen | Status | Left at High temp. 80℃ × 168hr | Test condition of Laboratory | Status | Left at High temp. 80℃ × 168hr |
|---|---|---|---|---|---|
| | 16~21℃, 55±5% | | | 16~21℃, 55±5% | |
| Date | - | - | Date | Nov. 27, 2014 | - |
| Temperature | - | - | Temperature | 21.7℃ | - |
| Relative Humidity | - | - | Relative Humidity | 53% | - |
| Left Time | - | - | Weather | Sunny | - |

| Direction | No. | Status | | | | Test photograph |
|---|---|---|---|---|---|---|
| Breadth | | Burning Distance(mm) | Burning time(sec) | Burning speed (mm/sec) | | |
| | 1 | 0 | 0 | SE(Self Extinguishing) | | |
| | 2 | 0 | 0 | SE | Max. Breadth: SE Length: SE | |
| | 3 | 0 | 0 | SE | | |
| | 4 | 0 | 0 | SE | | |
| | 5 | 0 | 0 | SE | | |
| | 6 | 0 | 0 | SE | | |
| Length | 1 | 0 | 0 | SE | | |
| | 2 | 0 | 0 | SE | | |
| | 3 | 0 | 0 | SE | | |
| | 4 | 0 | 0 | SE | | |
| | 5 | 0 | 0 | SE | | |
| | 6 | 0 | 0 | SE | | |

S&B., Ltd.

Prior Art

Prior Art

Prior Art

COMPOSITION FOR CAR INTERIOR TRIM AND PREPARATION METHOD USING THE SAME

CROSS-REFERENCE TO RELATED APPLICATION

This application claims priority to and the benefit of Korean Patent Application No. 10-2015-0031806 filed in the Korean Intellectual Property Office on Mar. 6, 2015, the entire contents of which are incorporated herein by reference.

BACKGROUND OF THE DISCLOSURE

1. Field of the Disclosure

The present disclosure relates to a composition for a car interior trim and a method of preparing the same, which can be used in a car seat and a door trim requiring durability and flame retardancy, and an environmental improvement as well, because of use of heavy metals, formaldehyde, volatile organic compounds (VOCs), organotin compounds, etc.

2. Description of the Related Art

Cars are popularized with the increase of cars and people spend a lot of time in driving a car or being inside the car. It is general to use several types of synthetic materials in order to produce an automobile, in particular a variety of chemical synthetic materials such as synthetic resins, synthetic rubbers, synthetic dyes and foaming agents, have been used to manufacture car interior trim provided inside cars. Also, the interior trim generally requires durability and flame retardancy and heavy metals, formaldehyde, chemical synthetic materials such as volatile organic compounds (VOCs) and an organotin compound should be decrease to a minimum.

Among this, a car seat and a door trim are manufactured by foaming and crosslinking polyurethane liquid resin to produce a cushion resin, sewing a leather, fabric or synthetic leather on the surface thereof to produce a cover and covering with it. Japanese patent publication Hei 7-330843 discloses polyurethane foam suitable for an automobile seat. The polyurethane foam has a rough surface not having a beautiful exposed surface, is discolored under the sunlight and a chair surface has a problem of being crumbled due to hydrolysis by moisture, and polyurethane foam is an open cell in which a cell structure is through the inside thereof and thus it could be a breeding ground for various bacteria because of infection of the bacteria. The polyurethane foam is light and has a good heat resistance and flame retardancy to be quite advantageous for a car interior trim but however the above problems still exist.

In addition, the car seat requires flame retardancy having at least specific level for the user's safety during a car accident, but it is not easy to increase flame retardancy of foam synthetic resin such as a polystyrene resin.

The research in the automotive and related industries has been focusing on their alternative materials but did not obtain the desired outcome because it is difficult to develop materials having foam moldability, light weight, flame retardancy, durability.

On the other hand, Korean patent 1326686 discloses a vehicle seat embodied in foam processed by high-pressure foaming composition containing olefinic block copolymer and styrenic block copolymer as a polymer base, a cross-linking agent and a foaming agent, however even though olefin film is absorbed on the surface, the durability decreases, especially olefin film peels off by a repetitive use of the user according to roller absorption method of the film.

Accordingly, an alternative composition for a car interior trim is still needful, which excludes the use of heavy metals, formaldehyde and chemical synthetic materials such as volatile organic compounds (VOCs) and organotin compounds, instead of a method of absorbing olefin film on polyurethane foam for a car interior trim.

SUMMARY OF THE DISCLOSURE

The object of the present invention is to provide an environmental friendly composition for a car interior trim and a method of preparing the same, which comprises forming an aqueous resin layer by coating on a polyurethane sponge for a car interior trim by a roller, thereby increasing durability, slipping property and flame retardancy, and promoting the user's comfort and safety, and eliminating the use of hazardous chemicals.

To accomplish the object of the present invention, an aspect of the present invention provides a composition for a car interior trim comprising: a polyurethane sponge layer for a car interior trim; and a water-soluble resin layer formed on the polyurethane sponge layer and comprising 20 to 50 parts by weight of a phosphorus-based flame retardant and 1 to 5 parts by weight of a thickener, based on 100 parts by weight of a coating agent blend of one or two more of a water-dispersed polyurethane or an aqueous acrylic resin.

In addition, the coating agent may comprise 30 to 50 weight % of the water-dispersed polyurethane or 30 to 50 weight % of the aqueous acrylic resin.

Furthermore, the water-dispersed polyurethane may comprise any one aliphatic isocyanate selected from the group consisting of diphenyl methane diisocyanate ($C_{15}H_{10}N_2O_2$), hexamethylene diisocyanate ($(CH_2)_6(NCO)_2$) and isophorone diisocyanate ($C_{12}H_{18}N_2O_2$); and any one polyol selected from the group consisting of polyester, polycarbonate, polyether and dimerate thereof.

In addition, the aqueous acrylic resin may be butyl acrylate or ethyl acrylate.

Also, the phosphorus-based flame retardant may be any one selected from the group consisting of cyclic phosphate, dimethyl methyl phosphate and triethyl phosphate.

The thickener may be any one selected from the group consisting of diethylene monobutyl ether urethane, an acrylic polymer and an alkali swellable associative thickener.

Another aspect of the present invention provides a method of preparing a composition for a car interior trim comprising: adding a phosphorus-based flame retardant into a resin and dispersing it, thereby preparing a coating agent (step 1); adding water into the dispersed coating agent and dispersing it at low speed, thereby preparing an aqueous resin (step 2); adding a thickener into the aqueous resin to control viscosity (step 3); rotating a polyurethane sponge layer on a roller and coating the aqueous resin thereon (step 4); and drying the polyurethane sponge layer coated with the aqueous resin (step 5).

The step 1 may comprise dispersing at high speed of 2000 to 5000 rpm for 20 to 30 minutes.

The step 3 may comprise adding 1 to 3 parts by weight of the thickener, based on 100 parts by weight of the dispersed aqueous resin.

The step 3 may comprise adding the thickener into the aqueous resin to control viscosity into 3,000 to 6,000 CPS.

The step 4 may comprise rotating the roller at 10 to 30 m/min and coating the aqueous resin with an amount of 20 to 50 g/m².

The step 5 may comprise drying at temperature of 130 to 160° C.

BRIEF DESCRIPTION OF THE DRAWINGS

FIG. 3 shows a result of the flammability test (MS 300-08) of a composition for a car interior trim according to exemplary an embodiment of the present disclosure.

DETAILED DESCRIPTION OF THE EMBODIMENTS

Figure 1:
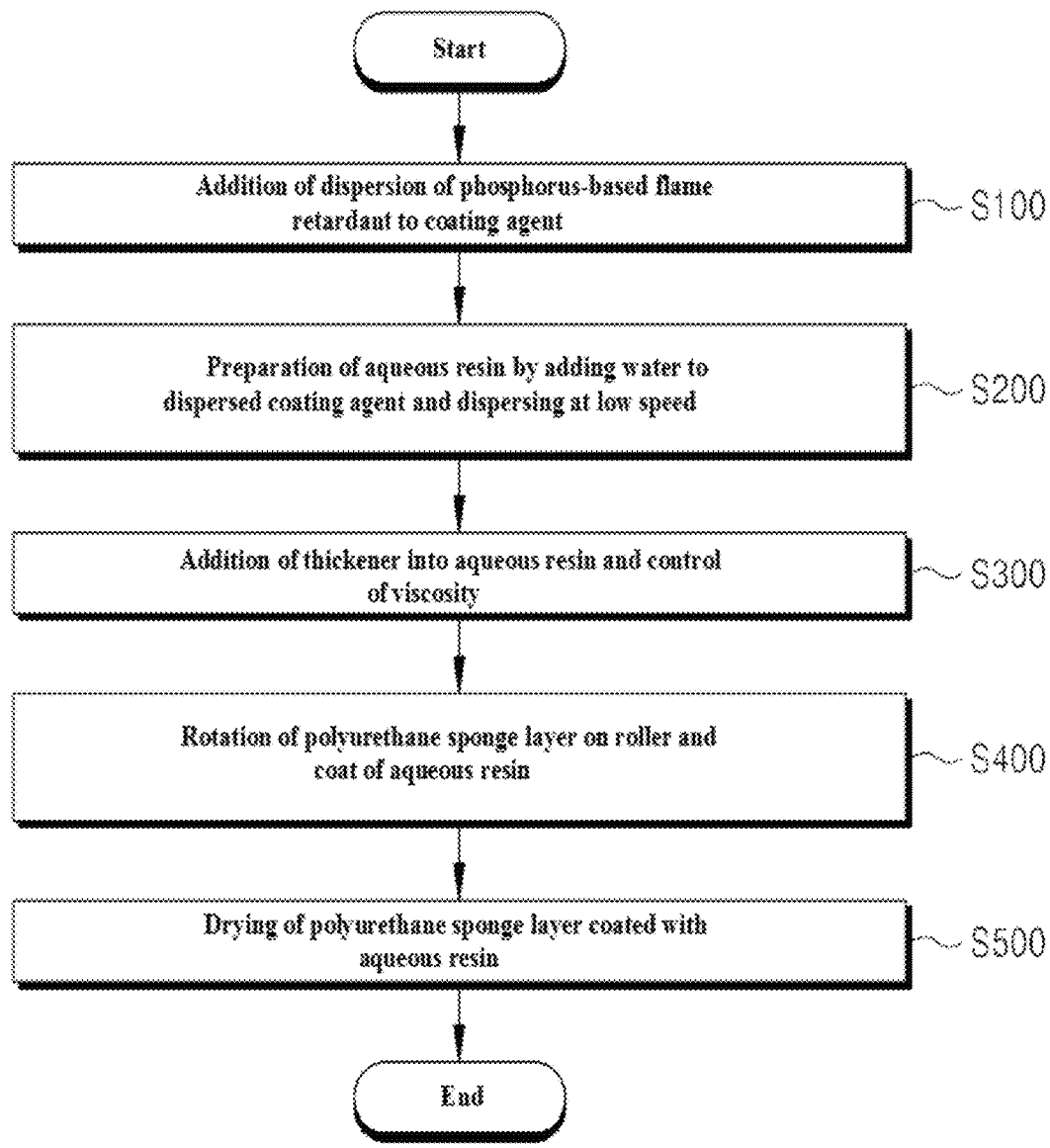
FIG. 1 is a flowchart illustrating a preparation method of a composition for a car interior trim according to exemplary embodiments of the present disclosure.

The inventors of the present invention has confirmed that uniform coating of an aqueous resin by roller greatly increases flame retardancy, slipping property and durability of polyurethane foam during a research of new resin for coating as an alternative of olefin film adsorbed on the polyurethane.

Hereinafter, an exemplary embodiment of the present disclosure will be described in detail.

The present invention provides a composition for a car interior trim comprising: a polyurethane sponge layer for a car interior trim; and a water-soluble resin layer formed on the polyurethane sponge layer and comprising 20 to 50 parts by weight of a phosphorus-based flame retardant and 1 to 5 parts by weight of a thickener, based on 100 parts by weight of a coating agent blend of one or two more of a water-dispersed polyurethane or an aqueous acrylic resin.

The composition for a car interior trim may be applied to a flame lamination or dry lamination by hot-melt, of natural leather, textile cloth or artificial cloth based on leather.

In addition, the sewing slipping property during sewing of car seat and the installation slipping property of seat assembly after sewing using the composition for a car interior trim can increase 4 to 5 times than those of the conventional olefin film.

The composition for a car interior trim may be a car seat or a car interior door trim.

The aqueous resin layer may comprise a resin, a phosphorus-based flame retardant and a thickener.

The aqueous resin layer may comprise any one or two more among water-dispersed polyurethane or aqueous acrylic resin.

The water-dispersed polyurethane may comprise any one aliphatic isocyanate selected from the group consisting of diphenyl methane diisocyanate ($C_{15}H_{10}N_2O_2$), hexamethylene diisocyanate ($(CH_2)_6(NCO)_2$) and isophorone diisocyanate ($C_{12}H_{18}N_2O_2$); and any one polyol selected from the group consisting of polyester, polycarbonate, polyether and dimerate thereof.

The water-dispersed polyurethane may comprise an aliphatic isocyanate and polyether polyol, and the addition of the water-dispersed polyurethane can disperse in waster easily and the addition of the aliphatic isocyanate and polyether polyol can exhibit a good adhesion.

The aqueous acrylic resin may be butyl acrylate or ethyl acrylate.

The coating agent may comprise 30 to 50 weight % of the water-dispersed polyurethane or 30 to 50 weight % of the aqueous acrylic resin.

If the content of the water-dispersed polyurethane or the aqueous acrylic resin included in the resin fails within the above range, the adhesion strength to a polyurethane sponge could be maintained.

The phosphorus-based flame retardant may be any one selected from the group consisting of cyclic phosphate, dimethyl methyl phosphate and triethyl phosphate.

The phosphorus-based flame retardant is a phosphorus-containing flame retardant, and if the content thereof is below the range, the sufficient flame retardancy could be obtained and if the content thereof is above the range, the cost can be increased to diminish the process efficiency.

In addition, the phosphorus-based flame retardant does not contain materials under the domestic and international regulations, but a brominated flame retardant used in the conventional olefin film contains the European environmental regulation material and there is a problem of corrosion and rust when using for a long time.

The thickener may be any one selected from the group consisting of diethylene monobutyl ether urethane, an acrylic polymer and an alkali swellable associative thickener.

If the thickener is not included, the viscosity of the aqueous resin layer may be decreased, thereby decreasing durability of the composition for a car interior trim.

According to another aspect of the present invention, the present invention provides a method of preparing a composition for a car interior trim comprising: adding a phosphorus-based flame retardant into a resin and dispersing it, thereby preparing a coating agent (step 1); adding water into the dispersed coating agent and dispersing it at low speed, thereby preparing an aqueous resin (step 2); adding a thickener into the aqueous resin to control viscosity (step 3); rotating a polyurethane sponge layer on a roller and coating the aqueous resin thereon (step 4); and drying the polyurethane sponge layer coated with the aqueous resin (step 5).

FIG. 1 is a flowchart illustrating a preparation method of a composition for a car interior trim according to exemplary embodiments of the present disclosure.

The resin may comprise any one or two more among water-dispersed polyurethane or aqueous acrylic resin.

Referring to the drawings, the step 1 may comprise dispersing at high speed of 2000 to 5000 rpm for 20 to 30 minutes.

If it is beyond the above range, the phosphorus-based flame retardant and the resin are not mixed together.

The step 2 may comprise adding 30 to 50 parts by weight of water based on 100 parts by weight of the dispersed resin and dispersing at low speed for 10 to 20 minutes in a disperser.

The aqueous resin may be produced by adding water in the above amount into the dispersed resin, and if an organic solvent is used, it is difficult to obtain the constant viscosity.

The step 3 may comprise adding 1 to 3 parts by weight of the thickener, based on 100 parts by weight of the dispersed aqueous resin.

If it is beyond the above range, the viscosity of the aqueous resin cannot be controlled.

The step 3 may comprise adding the thickener into the aqueous resin to control viscosity into 3,000 to 6,000 CPS.

If the viscosity is less than 3,000 CPS, the aqueous resin is excessively penetrated into the polyurethane sponge, to have a hard surface through hardening with hard and a crack in the aqueous resin layer.

If the viscosity more than 6,000 CPS, it is difficult to maintain a constant amount of the aqueous resin and increase the defect rate of the composition for a car interior trim during rotation of the polyurethane sponge layer by a roller in the step 4.

The step 4 may comprise rotating the roller at 10 to 30 m/min and coating the aqueous resin with an amount of 20 to 50 g/m$^2$.

If the aqueous resin is coated at the above speed, the aqueous resin can remain adhered to the polyurethane sponge and if the tension of the roller is larger than 30 m/min, polyurethane sponge could be broken during the coating.

If the coated amount of the aqueous resin is less than is 20 g/m$^2$, the coating effect is reduced thereby not obtaining the desired durability and flame retardancy, if it exceeds 50 g/m$^2$, the drying rate is reduced and the efficiency of the overall process is also decreased thereby.

In the step 5, an aqueous resin layer may be coated on the polyurethane sponge layer and dried at temperature of 130 to 160° C.

If the drying temperature is less than 130° C., the surface smoothness of the coated aqueous resin layer is good, but is poor in productivity and if it exceeds 160° C., the surface smoothness is decreased and a crack can be produced in the aqueous resin layer.

Herein, 10 to 30 parts by weight of an amino-modified silicone and 1 to 5 parts by weight of isocyanate may be added based on 100 parts by weight of the aqueous resin, after the step 3.

It can increase the elasticity and the friction durability of the aqueous resin layer by adding the amino-modified silicone and the addition of isocyanate as a cross-linking agent may increase the adhesive strength during coating.

Hereinafter, the present invention will be described in more detail by way of example. However, the invention is not limited by these examples.

Example 1: Preparation of Composition for Car Interior Trim

A polyurethane sponge, a water-dispersed polyurethane, an aqueous acrylic resin and a phosphorus-based flame retardant were purchased from Youngjin Texchem Co.

To a polyether-based water-dispersed polyurethane of 50 kg, butyl acrylate-based aqueous acrylic resin of 20 kg, triethyl phosphate (phosphorus-based flame retardant) of 30 kg was added and dispersed at 3,500 rpm for 30 minutes in a high-speed disperser and water of 30 kg was added and dispersed for 15 minutes in the high-speed disperser, to produce an aqueous resin.

The aqueous resin was coated with rotation of the polyurethane sponge in a gravure roller or typical rollers with an amount of 30 g/m$^2$, and dried at 140° C., thereby obtaining a composition for a car interior trim in which the aqueous resin layer was formed on the polyurethane sponge.

Experimental Example 1: Properties of Composition for Car Interior Trim

Figure 2:
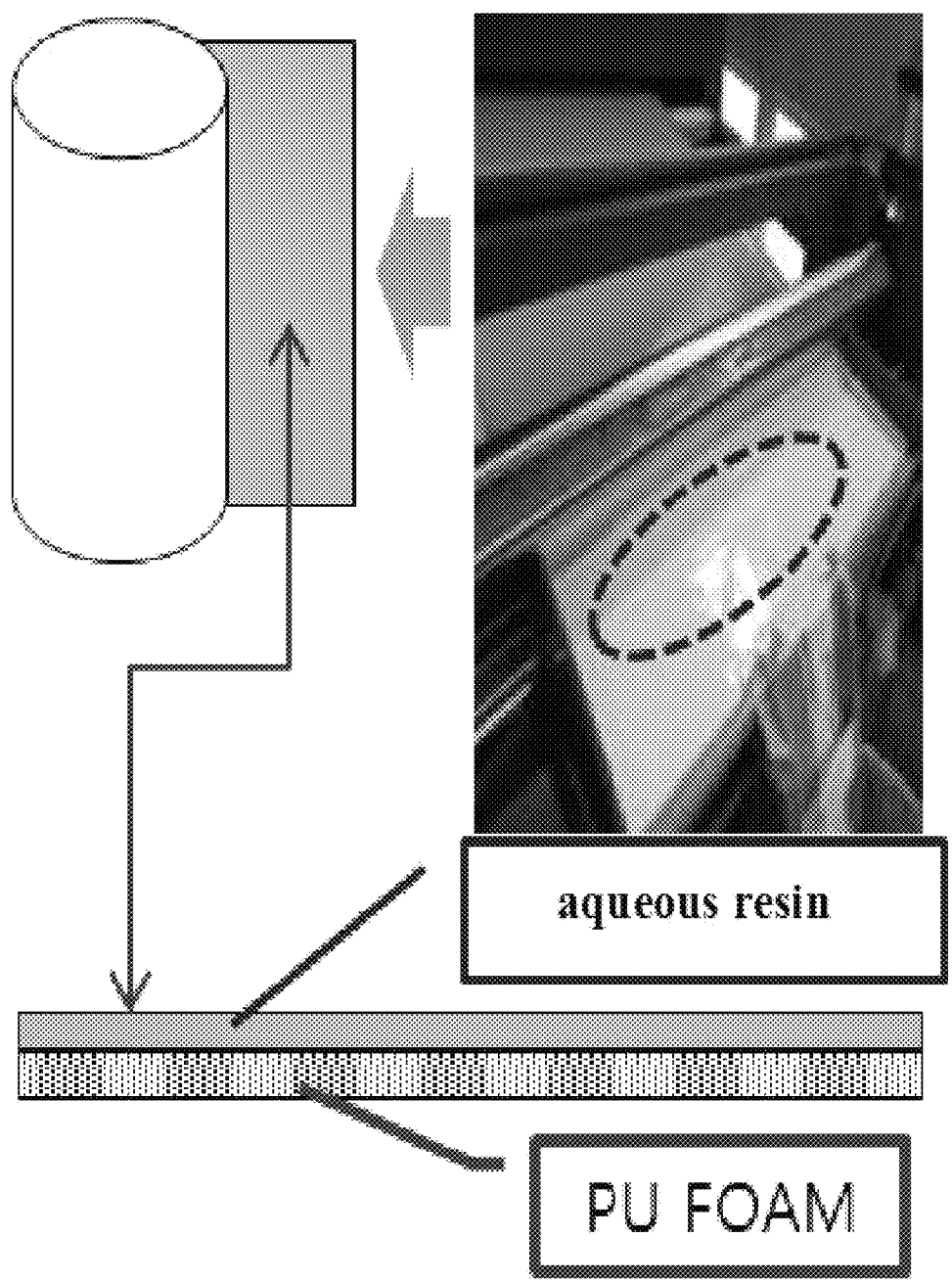
FIG. 2 is a schematic diagram illustrating a preparation method of a composition for a car interior trim according to exemplary embodiments of the present disclosure.

FIG. 1 is a flowchart illustrating a preparation method of a composition for a car interior trim according to exemplary embodiments of the present disclosure, and FIG. 2 is a schematic diagram illustrating a preparation method of a composition for a car interior trim according to exemplary embodiments of the present disclosure.

Referring to the drawings, the flame retardancy of a composition for a car interior trim obtained in Example 1 was confirmed by the flammability test (MS 300-08), the durability thereof was confirmed by the elevation the endurance test of Hyundai Daymos Co.

1. Flammability Test

FIG. 3 is a table shown a result of the flammability test of composition for a car interior trim according to an embodiment of the invention (MS 300-08).

The flammability test was performed under MS 300-08 standard criteria required by the Hyundai/Kia Motors. The MS 300-08 standard was confirmed if it meets the criteria according to the value measured by burning distance (mm) ÷burning time (sec)×60.

The composition for a car interior trim was confirmed to meet the flammability standards by the result of the flammability test.

Figure 4A:
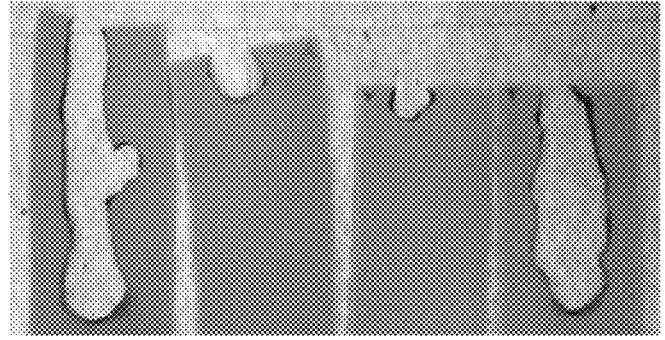
FIG. 4a shows a result of the flammability test (MS 300-08) of the conventional polyurethane sponge film on which olefin film is adsorbed.
Figure 4B:
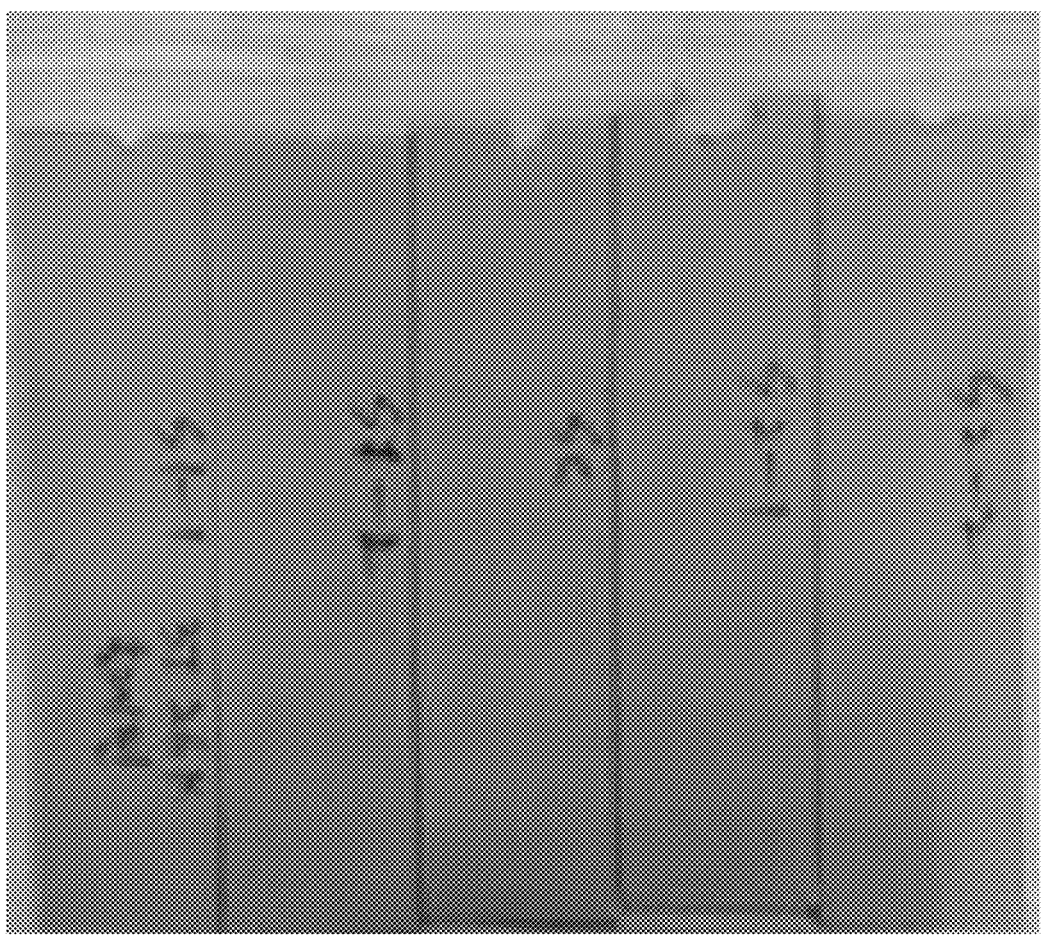
FIG. 4b is a photograph after the flame retardancy test of a composition for a car interior trim according to an embodiment of the present invention.

FIG. 4a is a photograph after the flame retardancy test of polyurethane sponge on which olefin film is adsorbed, which has been used in the conventional car seat, and FIG. 4b is a photograph after the flame retardancy test of the composition for a car interior trim according to an example of the present invention.

Referring to the drawings, a sponge on which an olefin film is adsorbed and used as conventional non-flame retardant film was confirmed to have poor flame retardancy, and the composition for a car interior trim according to Example 1 was confirmed that the flame was burned immediately (non-combustible) in 10 mm or less and burning at 80 mm/min or less in breadthwise and lengthwise sample tests of eight and to satisfy HKMC Spec. of the Hyundai/Kia Motor (HKMC) standards.

Herein, the "non-combustibility (does not ignite)" indicates not to burn for 15 seconds after the contact with a heat source.

2. Durability Test

To verify the durability, the durability test of car seat heaters by Hyundai Dymos was performed.

The durability test is a test method in which a robot handles ingress/egress seat testing.

Figure 5A:
FIG. 5a is a photograph after elevation endurance test of the conventional polyurethane sponge film on which olefin film is adsorbed.
Figure 5B:
FIG. 5b is a photograph after a simple friction test of the conventional polyurethane sponge film on which olefin film is adsorbed.

FIG. 5a is a photograph after elevation endurance test of the conventional polyurethane sponge film on which olefin film is adsorbed, and FIG. 5b is a photograph after a simple friction test of the conventional polyurethane sponge film on which olefin film is adsorbed.

Referring to FIG. 5, it was found that surface of the olefin film peeled off at about 3000 times of the conventional polyurethane sponge on which olefin film is adsorbed in 20,000 times of durability test by Hyundai/Kia Motors, and that it peeled as a result of simple friction test of approximately 10 times by hands.

Figure 6A:
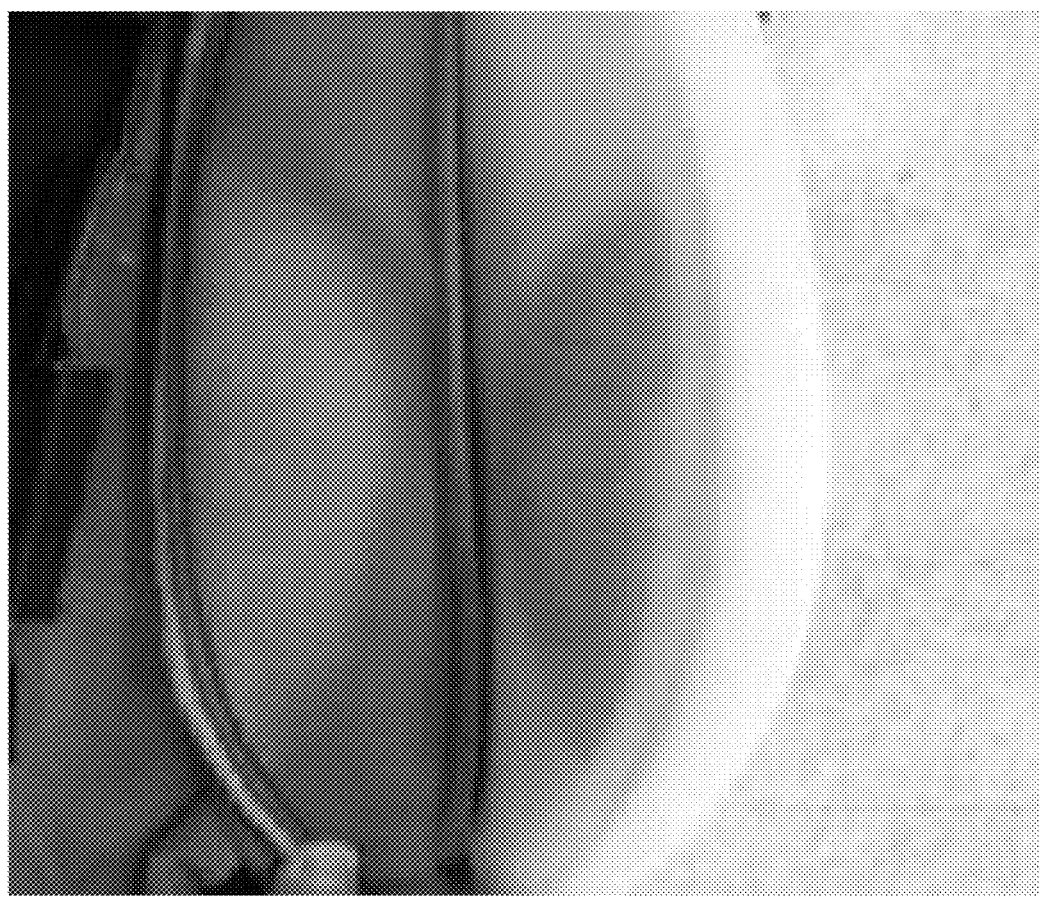
FIG. 6a is a photograph after elevation endurance test of a composition for a car interior trim according to an embodiment of the present invention.
Figure 6B:
FIG. 6b is a photograph after a simple friction test of a composition for a car interior trim according to an embodiment of the present invention.

FIG. 6a is a photograph after 20,000 times of elevation endurance test of a composition for a car interior trim according to an embodiment of the present invention, and FIG. 6b is a photograph after a simple friction test of a composition for a car interior trim according to an embodiment of the present invention.

Referring to FIG. 6, the composition for a car interior trim according to the Example 1 was not confirmed to be peeled off even after 20,000 times of elevation endurance test by Hyundai/Kia Motors and very different from the peeling of the conventional polyurethane sponge on which olefin film is adsorbed, and that the composition for a car interior trim did not peel as a result of simple friction test of approximately 20 times by hands.

As indicated above, the composition for a car interior trim according to the present invention has the durability by coating water-dispersed polyurethane resin or aqueous acrylic resin by a roller to improve a quality of a car interior trim, e.g. car seat. The conventional polyurethane sponge for a car interior trim is non-flame retardant film, however once it was adsorbed on a polyurethane sponge, the flame retardancy was decreased and customer claims occurred due to peeling of the olefin film by driver's friction after the installation of a car seat, but the present invention dramatically increased the flame retardancy by adding phosphorus-based flame retardant and confirmed optimal composition of aqueous resin layer leading to no peeling and durability improvement during the elevation endurance test after the installation of a car seat.

In addition, it was possible to produce a composition for a car interior trim, which excludes a use of a heavy metal, formaldehyde, chemical synthetic materials such as a volatile organic compounds (VOCs) and organotin compounds in very environmentally friendly manner.

According to a composition for a car interior trim and a method of preparing the same, the flame retardancy, the slipping property and the durability are greatly increased, compared with the conventional polyurethane foam on which an olefin film is adsorbed, and promoting the user's safety and convenience and eliminates a use of a heavy metal, formaldehyde, chemical synthetic materials such as a volatile organic compounds (VOCs) and organotin compounds to capable of preparing the composition for a car interior trim in very environmentally friendly process.

Example embodiments have been disclosed herein and although specific terms are employed, they are used and are to be interpreted in a generic and descriptive sense only and not for purpose of limitation. In some instances, as would be apparent to one of ordinary skill in the art as of the filing of the present application, features, characteristics and/or elements described in connection with a particular embodiment may be used singly or in combination with features, characteristics and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of preparing a composition for a car interior trim comprising:
adding a phosphorus-based flame retardant into a resin and dispersing it, thereby preparing a coating agent (step 1);
adding water into the dispersed coating agent and dispersing it at less than 2000 rpm, thereby preparing an aqueous resin (step 2);
adding a thickener into the aqueous resin to control viscosity (step 3)
rotating a polyurethane sponge layer on a roller and coating the aqueous resin thereon (step 4); and
drying the polyurethane sponge layer coated with the aqueous resin (step 5).

2. The method of preparing a composition for a car interior trim according to claim 1, wherein the step 1 comprises dispersing at high speed of 2000 to 5000 rpm for 20 to 30 minutes.

3. The method of preparing a composition for a car interior trim according to claim 1, wherein the step 3 comprises adding 1 to 3 parts by weight of the thickener, based on 100 parts by weight of the dispersed aqueous resin.

4. The method of preparing a composition for a car interior trim according to claim 1, wherein the step 3 comprises adding the thickener into the resin to control viscosity to 3,000 to 6,000 CPS.

5. The method of preparing a composition for a car interior trim according to claim 1, wherein the step 4 comprises rotating the roller at 10 to 30 m/min and coating the aqueous resin with an amount of 20 to 50 g/m$^2$.

6. The method of preparing a composition for a car interior trim according to claim 1, wherein the step 5 comprises drying at temperature of 130 to 160° C.

* * * * *